(12) United States Patent
Berends et al.

(10) Patent No.: US 6,195,947 B1
(45) Date of Patent: Mar. 6, 2001

(54) DEVICE FOR SHIELDING A SHED ENTRANCE

(75) Inventors: Jan Berends, Buitenpost; Wybe Jan Thymen Laverman, Beetgumermolen, both of (NL)

(73) Assignee: Stertil B.V. (NL)

( * ) Notice: Subject to any disclaimer, the term of this patent is extended or adjusted under 35 U.S.C. 154(b) by 0 days.

(21) Appl. No.: 09/173,078

(22) Filed: Oct. 14, 1998

(30) Foreign Application Priority Data

Oct. 15, 1997 (NL) .................................................. 1007283

(51) Int. Cl.[7] .................................. E06B 5/00; E06B 1/00
(52) U.S. Cl. ...................... 52/173.2; 49/476.1; 49/480.1
(58) Field of Search ..................... 52/173.2; 49/475.1, 49/476.1, 480.1; 160/57

(56) References Cited

U.S. PATENT DOCUMENTS

| | | | |
|---|---|---|---|
| 3,528,086 | * | 9/1970 | Conger ............................ 52/173.2 X |
| 3,538,655 | * | 11/1970 | Frommelt et al. ................... 52/173.2 |
| 4,365,452 | * | 12/1982 | Fillman et al. ..................... 52/173.2 |
| 4,495,737 | * | 1/1985 | Alten ................................. 52/173.2 |
| 4,724,648 | * | 2/1988 | Diepholder ........................ 52/173.2 |
| 4,825,606 | * | 5/1989 | Alten ................................. 52/173.2 |
| 5,450,696 | * | 9/1995 | Alten ................................. 52/173.2 |
| 5,467,563 | * | 11/1995 | Borchardt ......................... 52/172.12 |
| 5,927,025 | * | 7/1999 | Brockman et al. ................. 52/173.2 |

FOREIGN PATENT DOCUMENTS

| | | |
|---|---|---|
| 9305273 | 6/1994 | (DE) . |
| 2510651 | 7/1982 | (FR) . |

* cited by examiner

*Primary Examiner*—Robert Canfield
(74) *Attorney, Agent, or Firm*—Mark Zovko

(57) ABSTRACT

The present invention relates to a device for protecting a shed entrance, particularly during loading and/or unloading of a vehicle parked thereagainst, comprising: a wall-mounted frame arranged on a wall outside the shed entrance; a hanging frame which is held in a plane substantially parallel to that of the wall-mounted frame and at a distance therefrom with resilient separating means; wherein the separating means comprise an elongate body of form-retaining material extending in upward direction between the wall-mounted frame and the hanging frame and a coupling of elastic material on both ends of the body, wherein each coupling is connected to one of respectively the wall-mounted frame and the hanging frame.

12 Claims, 5 Drawing Sheets

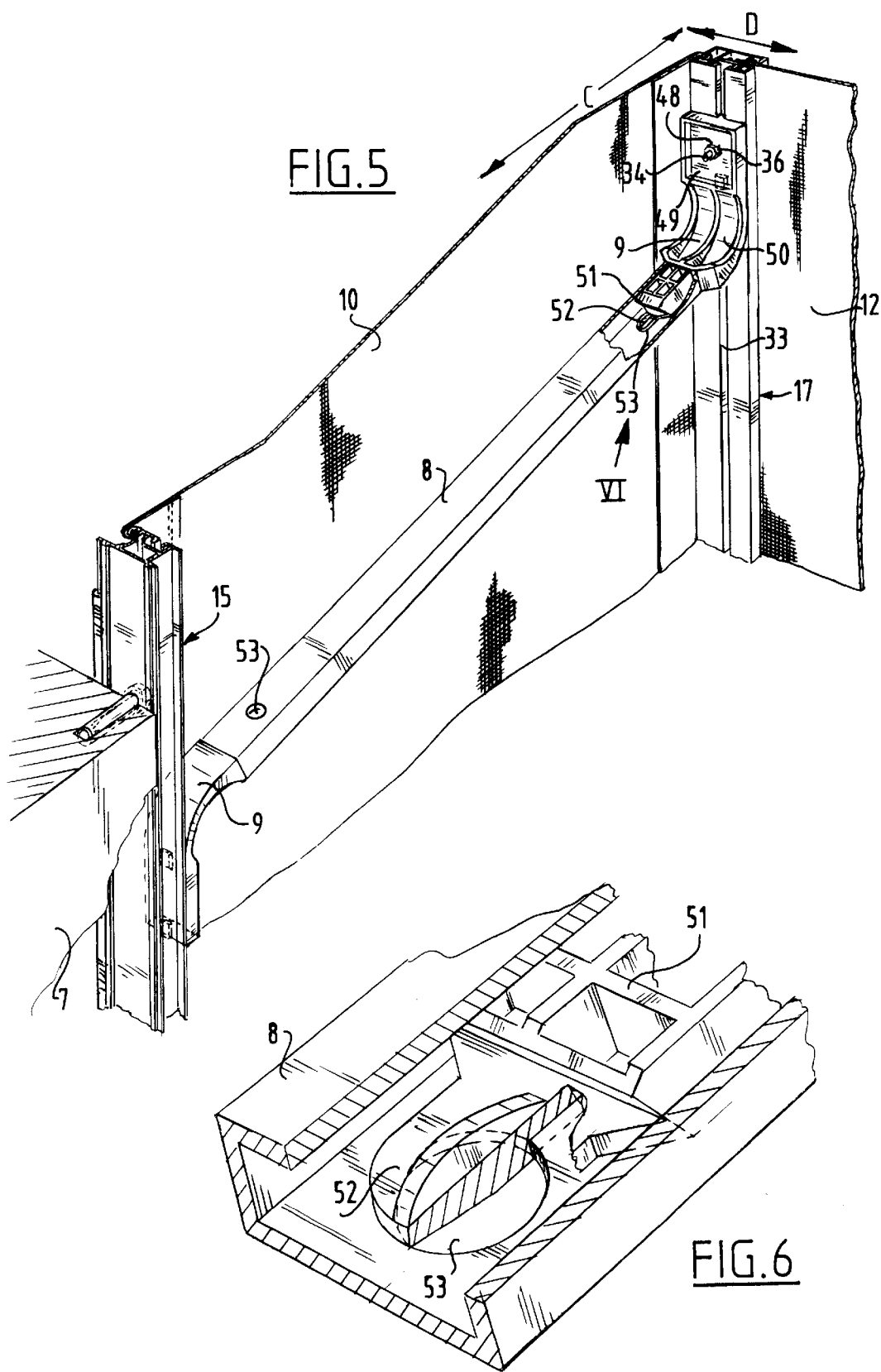

DEVICE FOR SHIELDING A SHED ENTRANCE

The present invention relates to a device for protecting a shed entrance, particularly during loading and/or unloading of a vehicle parked thereagainst, comprising:
a wall-mounted frame arranged on a wall outside the shed entrance;
a hanging frame which is held in a plane substantially parallel to that of the wall-mounted frame and at a distance therefrom with resilient separating means.

Such a device is generally known in the art, wherein between the wall-mounted frame and the hanging frame a fabric or similar element is arranged which is suspended therebetween to prevent rain entering. In order to hold the hanging frame in suspended situation parallel to and at a distance from the wall-mounted frame, use is usually made of the weight of the hanging frame and the fabric or of a relatively long spring or of a pulley system with weights.

A drawback of the known art is that it is complicated, wherein such a long spring is subject to deformation, particularly when it is loaded continuously as in the case of a dock shelter, whereby the operation thereof deteriorates. With use of these often spirally wound springs, not only is deformation possible in the direction perpendicular to the outside wall but also transversely of this direction, which is undesirable since when the truck is driven into the shelter the hanging frame will be loaded in this transverse direction and thereby be bent sideways, thereby resulting in inadequate protection. When flexibility is equally great both in the driving direction and transversely thereof, lateral movements of particularly the hanging frame relative to the wall-mounted frame will moreover already occur under the influence of a (slight) side wind, while the resilience of the separating means serves substantially to absorb the knocks which occur when the vehicle collides with the hanging frame. Pulley systems have the drawback of being susceptible to breakdown and fitting thereof is time-consuming.

The present invention has for its object to obviate at least one of the above stated drawbacks of the known art, and a device is provided for this purpose which is distinguished in that the separating means comprise an elongate body of form-retaining material extending in upward direction between the wall-mounted frame and the hanging frame and a coupling of elastic material on both ends of the body, wherein each coupling is connected to one of respectively the wall-mounted frame and the hanging frame.

With a device according to the present invention an effective configuration is provided for suspending the hanging frame in relation to the wall-mounted frame, the operation of which is very reliable, which is simple to mount and which can function for a prolonged period without maintenance, since in part a rigid component is applied herein which is provided only on the ends thereof with a resilient hinged coupling of elastic material. The coupling is preferably designed to display a higher degree of flexibility in the direction from the wall-mounted frame to the hanging frame than in the direction transversely thereof.

In a preferred embodiment a device according to the present invention has the property that the coupling is an integrally formed element. The coupling herein forms a single connection between the body of form-retaining material, such as a rod, and profiles of the hanging frame and the wall-mounted frame. A simple configuration is obtained in this manner which is quick and easy to assemble. Use is preferably made of polyoxymethylene, also known as POM or spring steel, as elastic or resilient material.

In a second preferred embodiment a device according to the present invention has the property that the coupling comprises a releasable engaging member for placing into co-acting situation with the body. In addition to an easy and rapid assembly, an equally simple and rapid disassembly of the device is thus also possible.

In a third preferred embodiment of a device according to the present invention, the device has the property that the body is hollow at least on the outer ends thereof, wherein a part of the coupling can be placed into one of the hollow ends of the body. In combination with fabric between the wall-mounted frame and the hanging frame and the limitation on the distance therebetween which is hereby imposed, a very reliable connection of the coupling and the elongate body of form-retaining material is thus obtained, even if for instance a vehicle such as a truck were to press the hanging frame in the direction of the wall-mounted frame as a result of being driven in incorrectly. The thus generated bias can be enhanced with a configuration of the coupling designed for this purpose, wherein at least the coupling arranged on the wall-mounted frame exerts a downward force on the elongate body. In preference a device according to the present invention herein has the property that the body is provided in at least an internal wall thereof with a recess, and close to the outer end in the direction of the body the coupling has a protrusion co-acting in the assembled situation with the recess. This protrusion therefore functions as hook which engages in the recess, which connection can be released in simple manner by pressing the protrusion, which is after all also manufactured from resilient material, out of the recess and subsequently releasing the coupling and the body from each other. This advantage is further enhanced in a device according to the present invention with the property that the recess is arranged through the wall of the body, wherein the protrusion can be pressed out from the outside of the body and co-action between protrusion and recess can be discontinued.

In a fourth preferred embodiment a device according to the present invention has the property that the coupling comprises aligning means, wherein in co-action with one of the wall-mounted frame and the hanging frame the coupling can be aligned relative thereto, and fixing means, wherein after alignment the coupling can be fixed to the respective one of the wall-mounted frame and the hanging frame. In this manner a bias in the coupling is possible with which the fabric element is held under tension between the wall-mounted frame and the hanging frame and wherein it is ensured that the hanging frame can be positioned such that it is situated straight in front of the wall-mounted frame. In preference a device according to the present invention herein has the property that the wall-mounted frame and the hanging frame each comprise a C-shaped profile in which the fixing means engage. An example hereof is a hammer-head bolt which can be arranged in the C-shaped profile, wherein assembly of the device according to the present invention is optimally simple by first positioning the hammer-head bolt approximately in the C-shaped profile and subsequently positioning the coupling precisely relative to the fixing means designed for instance as hammer-head bolt.

The present invention also relates to a coupling as evidently intended for a device with one or more than one of the above stated properties.

Other properties of a device according to the present invention as stated explicitly in the dependent claims will also be further elucidated on the basis of the figure description following hereinbelow. In the drawing:

FIG. 5 shows a perspective view of connection of the wall-mounted frame and the hanging frame;

FIG. 6 shows in perspective view a detail of a coupling in the assembled state with a connection as according to FIG. 5.

Figure 1:
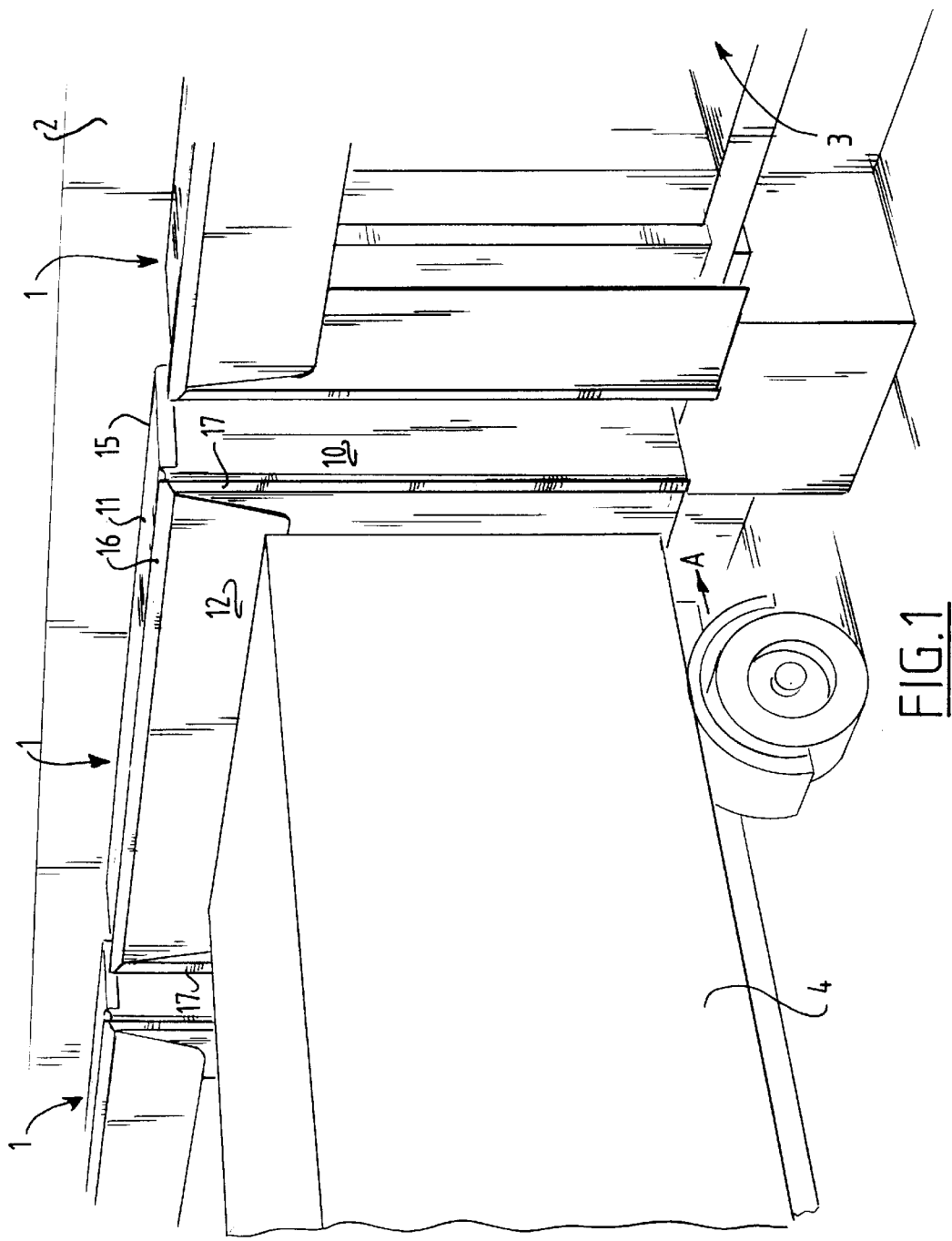
FIG. 1 shows a perspective view of three devices according to the present invention.

The view of FIG. 1 shows three devices according to the present invention which are each arranged round an entrance to a shed 2, entrances 3 of which are used for loading and unloading trucks, one such being shown and designated with 4 in these figures. Devices 1 are also known as dock shelters on account of the above described use thereof.

Truck 4 herein drives into the dock shelter in reverse direction to the frontage or wall of shed 2, so that the floor of the entrance 3 of shed 2 and the loading floor of truck 4 lie at practically the same height, which can if required be further levelled using a dock leveller for the purpose of loading and/or unloading truck 4. The travel direction for parking in device 1 is indicated with arrow A. When truck 4 is parked against the wall of the shed 2, the rear of truck 4, entrance 3 and people walking there are protected by device 1 from weather influences such as rain and wind.

The configuration of device 1 according to the present invention will be further described hereinbelow with reference to FIG. 2.

Figure 2:
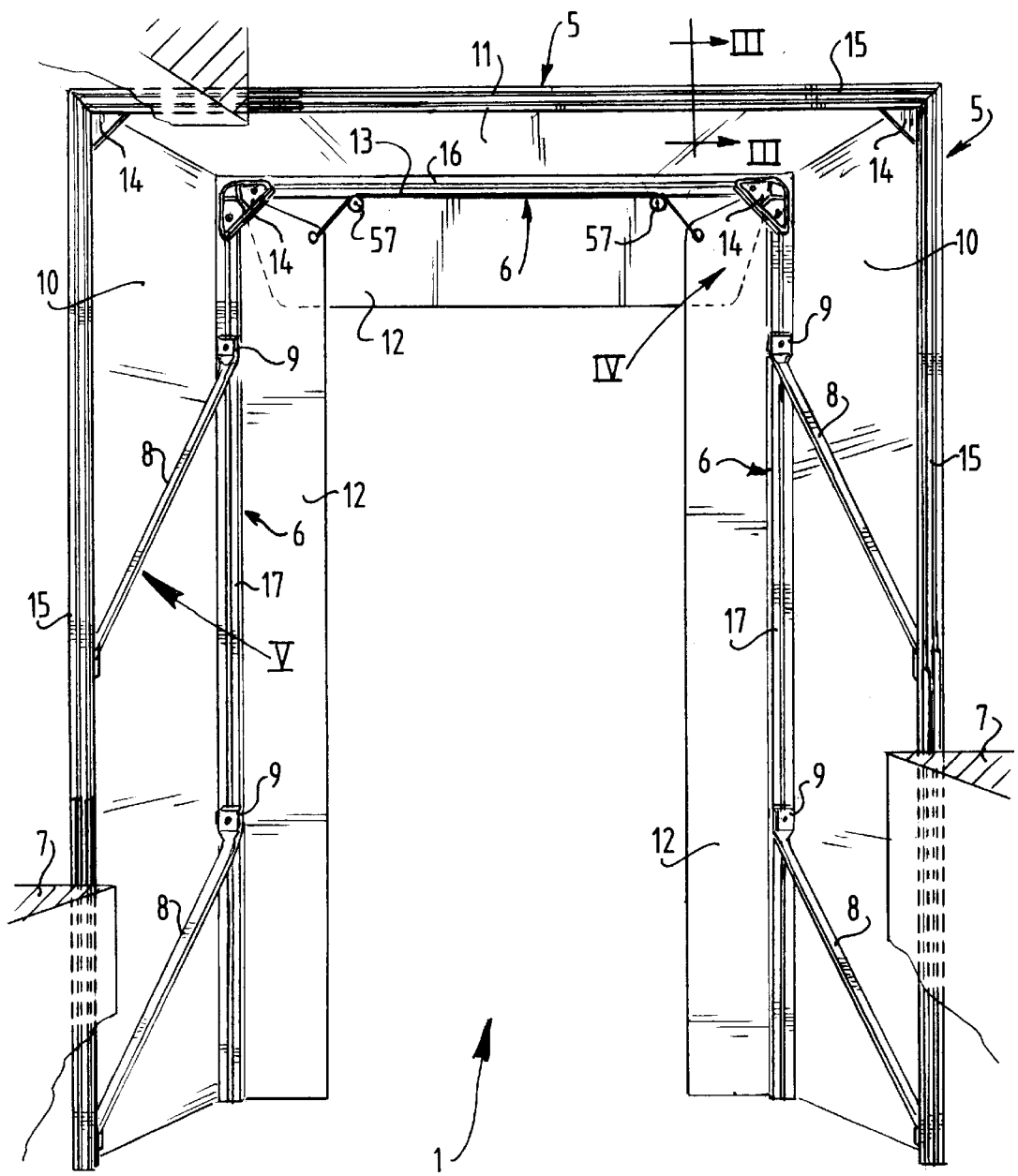
FIG. 2 is a rear view of one of the devices shown in FIG. 1 from the shed, round the entrance of which the device is arranged.

The device 1 shown in perspective view in FIG. 2 comprises a wall-mounted frame 5 which is arranged on the wall 7 around entrance 3 which is shown in FIG. 1 but not in FIG. 2. Placed at a distance from wall-mounted frame 5 is a hanging frame 6 which is held at a distance using rods 8 which function as resilient separating elements.

The resilience thereof is obtained with resilient couplings 9, which will be further discussed hereinafter. Rods 8 are each connected to wall-mounted frame 5 as well as to hanging frame 6 by means of the couplings 9.

Also arranged on each side of device 1 between wall-mounted frame 5 and hanging frame 6 is a side fabric 10 and at the top is arranged a top fabric 11. Side fabrics 10 and top fabric 11 are connected on both sides in the width direction thereof to wall-mounted frame 5 and hanging frame 6. Hanging frame 6 is further provided in the front plane, which contains an opening for entry of the truck, with flaps 12 with dimensions such that they fit round the rear part of the entering truck to protect against weather influences. Flaps 12 are suspended by means of a tensioning system with elastic cables 13, this being further elucidated hereinbelow. It is however noted that cables 13 are preferably elastic in order to prevent the flaps 12 hanging downwards at the side and to ensure that flaps 12 remain in a desired starting position.

Side fabrics 10 and top fabric 11 are preferably manufactured from bisonyl and flaps 12 from PVC, for instance with a thickness of about 3 mm, wherein a number of fabric inlays are incorporated therein. Materials other than those mentioned here can however also be applied for side fabrics 10, top fabric 11 and flaps 12.

The profiles of wall-mounted frame 5 are identical and mutually connected in a reverse U-shaped configuration by means of connecting plates 14. One of these profiles of wall-mounted frame 5 is shown in more detail in FIG. 3 and further described below where this profile is designated with 15.

Figure 4:
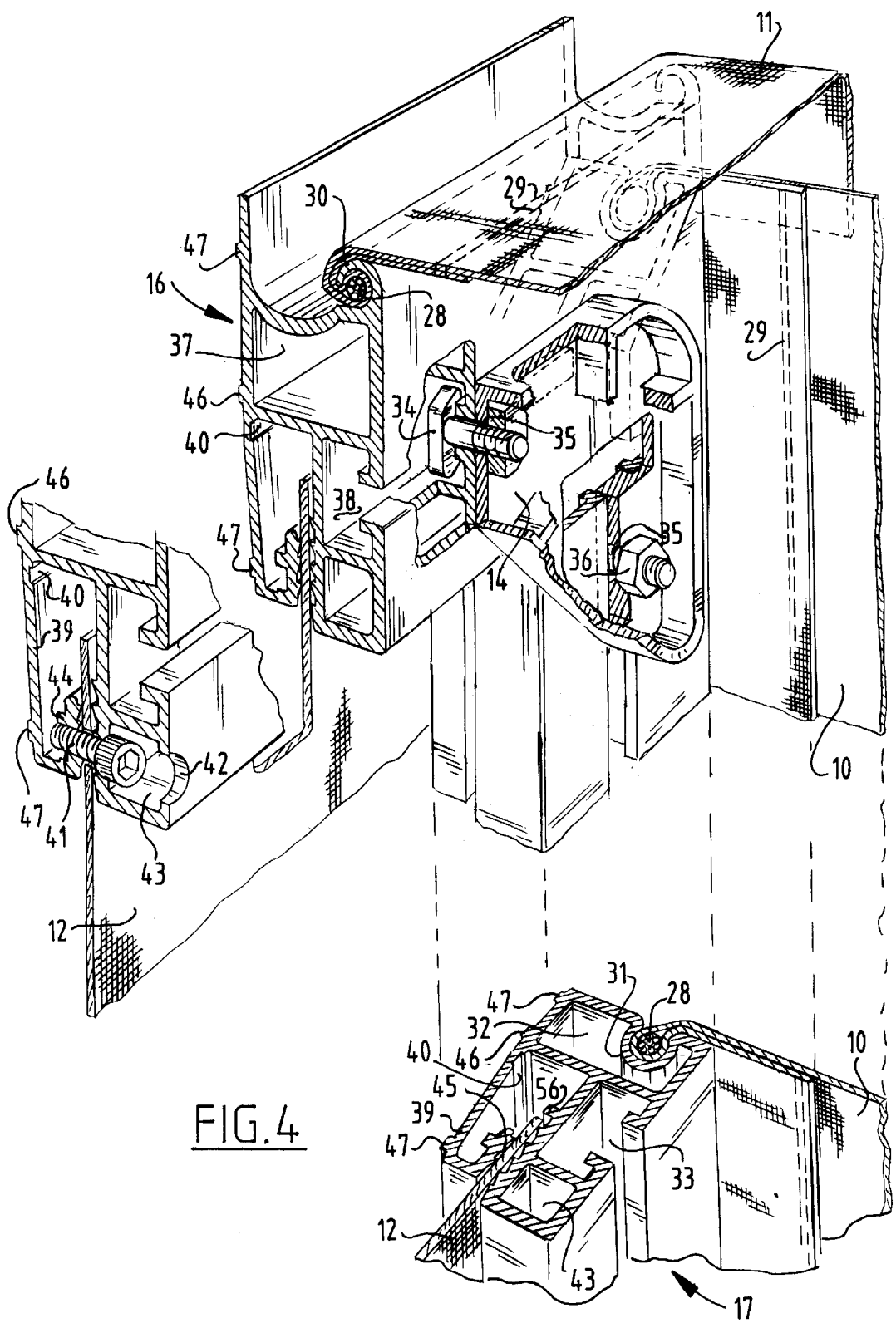
FIG. 4 is a partly cut-away perspective view of components of the hanging frame and fabric elements of a device according to the present invention.

For the hanging frame 6 use is made of two different types of profile, on the one hand the horizontally positioned profile 16 and on the other the vertically positioned profiles 17, wherein each of the vertically positioned profiles 17 is connected at the upper end thereof by means of the connecting plates 14 to one of the outer ends of the horizontally positioned profile 16 so as to obtain in this manner a reverse U-shape and thus hanging frame 6. The configuration of profiles 16, 17 in combination with that of connecting plates 14 and side fabrics 10, top fabric 11 and flaps 12 is shown in FIG. 4 and is described hereinbelow with reference to this FIG. 4.

Figure 3:
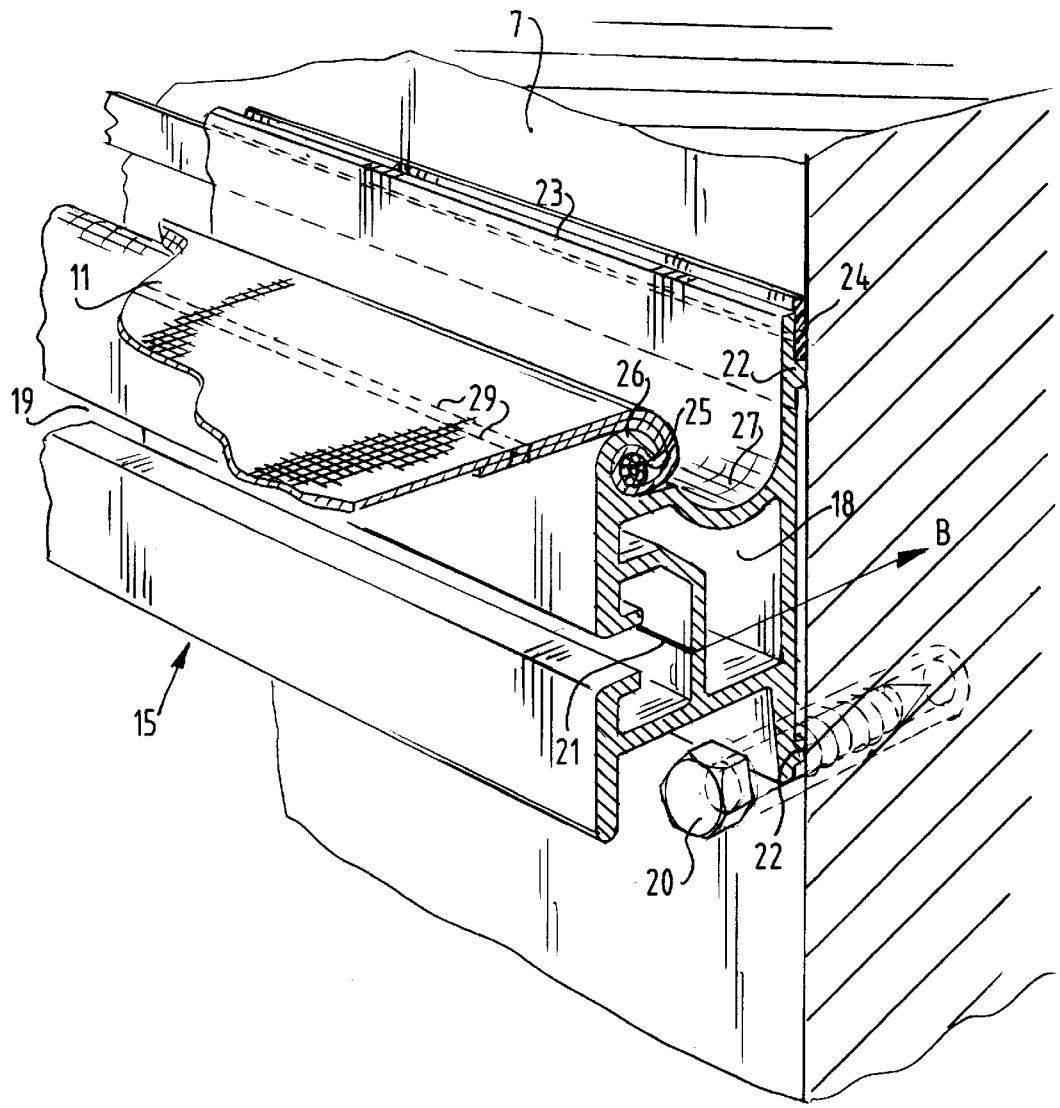
FIG. 3 shows a perspective view of a profile as component of the wall-mounted frame.

FIG. 3 shows a perspective view in cross-section along the line III—III in FIG. 2 of a profile 15 of wall-mounted frame 5. This profile 15 substantially comprises a hollow profile 18 and an open profile 19 which are located mutually adjacently in the outward direction away from wall 7, which direction corresponds with that of top 15 fabric 11. The same also applies for the other legs of the U-shaped wall-mounted frame 5 as shown in FIG. 2, wherein however not the top fabric 11 but the side fabrics 10 determine the orientation of the relevant profile 15. The horizontally running profile 15 shown here is connected on either end thereof to the vertically running profiles 15 of wall-mounted frame 5 using a connecting plate 14 such as is shown in FIG. 2, this in the same manner as profiles 16 and 17 of hanging frame 6, which connection will be further described hereinafter with reference to FIG. 4.

During fitting of a device according to the present invention use is made of bolts 20 which are placed at relatively large mutual distance in wall 7, wherein profile 15 comes to rest thereon as shown in FIG. 3. When the desired positioning of profile 15 has herein been reached, or alternatively prior thereto, holes are drilled through the hollow profile 18, for which purpose a marking 21 is arranged in the open profile 19 on an inner wall thereof so that a drilled hole is accurately centred in relation to the open profile 18. When this marking is used for drilling of the hole, a screw or bolt or other fastening means can be placed therethrough in the direction of arrow B without problems of alignment in order to bring about fixing of profile 15 to the wall 7.

Bolts 20 are then superfluous, since they are only useful during mounting of the profile 15.

During mounting of profile 15 it is important that he strips 22 on the rear of profile 15 connect closely to the wall 7 in order to prevent the possibility of rainwater dripping through behind the profile. In order to improve this action, a band of cellular rubber 24 is arranged above the uppermost of the strips 22 between wall 7 and upright edge 23, which extends in upward direction from hollow profile 18, which rubber compresses under the influence of pressure when a fixing is arranged in the direction of arrow B and forms a tight seal against water seeping through behind profile 15. The band of cellular rubber protrudes slightly above upright edge 23 in order to prevent rainwater remaining thereon. This configuration is particularly advantageous in the case of an outside wall 7 displaying some degree of unevenness, which is thus counteracted in effective manner.

Top fabric 11 is folded round a string 25 and in the thus created situation closed along the zone 27, for instance by stitching thereof. Sealing, glueing or adhesion with double-sided tape is also possible. String 25 with the top fabric 11 folded therearound is then pushed into an arm 26 which forms the additional open profile and which in the shown cross-section comprises a part of the circumference of a circle, which circle has at least the same diameter as the dimension of the string 25 with top fabric 11 folded therearound, and wherein the opening equals at least twice the thickness of top fabric 11 and is at most smaller than the dimensions of string 25 with top fabric 11 folded therearound.

It can be seen clearly here that the top side of the hollow profile 18 is provided between arm 26 and the upright edge 24 with an inward curvature which serves as gutter or rainwater drain 27. Thus is ensured that rainwater, which falls for instance along wall 7 or directly onto top fabric 11 or into the gutter or rainwater drain 27 of profile 15, is drained in lateral direction along gutter 27. In contrast to draining of rainwater over top fabric 11 in forward direction relative to wall 7, lateral draining of rainwater through gutter 27 has the advantage that none of the rainwater falling thereon can find its way onto the rear part of the truck parked in device 1 and thus still flow into the shed 2 if the truck 4 parked therein slants slightly to the rear. Top fabric 11 further hangs down in the direction of the hanging frame, whereby rainwater falling thereon is drained in lateral direction by a gutter in the hanging frame such as that designated here with 24.

It is further noted here that arm 26, which forms the additional open profile, is located at a distance from open profile 19, wherein hollow profile 18, open profile 19 and the additional open profile formed by arm 26 form a unit together with upright edge 23 and strips 22, wherein the thus formed profile 15 can be manufactured in relatively simple manner by extrusion of for instance a material such as aluminium, which is particularly suitable because of the low cost price and the workability thereof during extrusion.

The open profile 19 with the marking 21 on the inner wall thereof serves to accommodate therein and conceal from sight the fixing means which have to be arranged through hollow profile 18 in the direction of arrow B. Space is moreover provided in open profile 19 for engagement by engaging means for connection of profile 15 to one of the other components of device 1. Examples hereof are the connecting plates 14. Use can be made for this purpose of for instance hammer-head bolts which can be placed in open profile 19 in a relative position in relation to the opening thereof and which, after rotation through almost a quarter turn, clamp fixedly against the inner walls of open profile 19. The head thereof is then also hidden from sight and only the thread of the hammer-head bolt protrudes out of the opening of open profile 19, wherein arranging of a nut over the screw thread enhances the clamping effect when it is tightened. This is shown for instance in FIG. 4.

FIG. 4 shows a partly broken away perspective view corresponding with arrow IV in FIG. 2. The profiles 16 and 17 shown here are connected respectively to top fabric 11 and one of the side fabrics 10 in the same manner as described with reference to FIG. 3, wherein use is made of strings 28 around which top fabric 11 and one of the side fabrics 10 are respectively folded, wherein these strips are then stitched up along lines 29.

Alternatively, these strips can be sealed, glued or adhered with double-sided adhesive tape.

The string 28 associated with profile 16 is pushed in the same manner as shown in FIG. 3 into a space formed by an arm 30 of profile 16 from which the string with top fabric 11 folded therearound cannot be removed other than by sliding in longitudinal direction thereof. Arm 30 has a bend for partial enclosure of a rod-shaped space and thus forms the additional open profile. In contrast, the string 28 associated with profile 17 and having side fabric 10 folded therearound is pushed into a n-shaped part 31 of hollow profile 32 of profile 17, wherein here also the string 28 with side fabric 10 folded therearound cannot be removed from this n-shaped part 31 other than by sliding in longitudinal direction thereof through this n-shaped part 31.

Arranged in profile 17 opposite n-shaped part 31 relative to hollow profile 32 is the open profile 33 which is once again suitable for receiving engaging means such as the above described hammer-head bolts. In the embodiment shown here use is made of a hammer-head bolt to effect fixing of profiles 17 and 16 to connecting plate 14. The thread of hammer-head bolts 34 protrudes through the opening of open profile 33 and through holes 35 in connecting plate 14, where nuts 36 are screwed onto hammer-head bolts 34. Open profile 33 enables adjustment of hammer-head bolts 34 and therefore of corner plate 14 relative to profiles 16 and 17. Substantially the same description applies to profile 16 with hollow profile 37 and open profile 38, wherein the thread of hammer-head bolts 34 in open profile 38 protrudes through the opening in open profile 38 and a hole 35 in connecting plate 14 and is there engaged using a nut 36 for tightening the hammer-head bolts in open profile 38 and for mutual fixing of connecting plate 14 and profile 16. The manner in which flaps 12 are arranged on profiles 16 and 17 in the front plane of the device in FIG. 1 and FIG. 2 is substantially the same for both these profiles 16, 17. A single description of this fixing will therefore suffice here and addition will be made where either of the profiles 16, 17 requires separate description.

Profile 16 is provided with clamping means which are located in the proximity of both hollow profile 37 and open profile 38. These clamping means are formed by a leg 39 which is connected to hollow profile 37 close to a recess 40 forming a bending line. For fixing of flaps 12 these latter are arranged between leg 39 and open profile 38. Use is made herein of screws 41 which may or may not be self-tapping, for which purpose a hole 42 is or is not drilled through an additional hollow profile 43 and a part of leg 39, which leg 39 is thickened slightly at 44 round the screw 41 in order to provide this latter with sufficient grip. In this manner screw 41 can be counter-sunk in the additional hollow profile 43 which is arranged on open profile 38 opposite leg 39 relative to flap 12. The leg 39, hollow profile 37, open profile 38 and additional hollow profile 43 herein form a unit. By tightening screw 41 the leg 39 is bent along the bending line formed by recess 40. For optical masking of this effect an additional buffer block 46 is arranged in the proximity of this bending line. Profiles 16 and 17 are otherwise also provided on the front side thereof with buffer blocks 47, the primary function of which is to protect the profiles against a collision with a parking vehicle such as the truck 4 in FIG. 1. Because leg 39 is bent and pulled toward the additional hollow profile 43, flaps 12 are clamped therebetween. In order to increase the grip, the part of leg 39 directed toward flap 12 is provided with an intentionally roughened surface 45 to increase the grip on flap 12. The same applies for the part of the additional hollow profile 43 directed toward flap 12.

Opposite the leg 39 a stop 56 is provided in profile 17 in order to define the depth to which the flap 12 on the side of the device can be placed into this profile.

FIG. 5 shows a perspective view in accordance with arrow V in FIG. 2. Couplings 9 are herein manufactured from resilient material such as POM, or polyoxymethylene, otherwise known as spring steel. Couplings 9 are here manufactured integrally as injection-mouldable sheet profile. The coupling 9 connected to profile 17 and rod 8 is mounted on a hammer-head bolt 34 which is tensioned in the open profile 33 of profile 17 and fixed there using a nut 36. Coupling 9 contains inter alia a plate 49 with a hole 48 therein, wherein for adjustment of the relative position of coupling 9 in relation to profile 17 use can be made of an adjustment of the hammer-head bolt therefor in hollow profile 33. Connecting onto plate 49 the coupling 9 comprises a curved part 50 with a greater width than the thickness thereof which is connected on the side opposite plate 49 to an insert 51 placed in an outer end of rod 8. Situated on the end of this insert 51 is a hook 52 which, under the influence of a biasing force formed therein beforehand, is pressed into an opening 53 in the relevant rod 8. The snap closure formed in this manner can be broken in simple manner by pressing the hook 52 toward the interior of the relevant rod 8 and subsequently sliding this relevant rod 8 from the coupling 9. The configuration of insert 51, hook 52, opening 53 in combination with the relevant rod 8 is shown in more detail in FIG. 6, as designated with arrow VI in FIG. 5.

Couplings 9 are preferably formed per se such that, apart from the weight hanging from profile 17, a bias force is generated by the relevant rod 8 and the couplings 9 on either ends thereof, whereby the side fabric 10 is stretched tautly. In addition, the rod 8 is long and positioned at a large angle of inclination such that if a vehicle were to collide with the hanging frame, the hanging frame will fold up exactly against the wall-mounted frame.

FIG. 5 shows particularly clearly that couplings 9 are wider than they are thick, whereby flexibility of coupling 9, and therefore the freedom of movement of hanging frame 6 in the direction of arrow D, are markedly less than in the direction of arrow C. Adequate flexibility is hereby provided in the case a vehicle collides with the device, while in the direction transversely of the collision direction of the vehicle (parallel to the wall) a relatively markedly greater rigidity is provided and thereby also a relatively greater resistance to the influence of side wind.

What is claimed is:

1. Device for protecting a shed entrance, particularly during loading or unloading of a vehicle parked thereagainst, comprising:

a wall-mounted frame arranged on a wall outside the shed entrance;

a hanging frame which is held in a plane substantially parallel to that of said wall-mounted frame and at a distance therefrom with resilient separating means; wherein the separating means comprise an elongate body of form-retaining material extending in upward direction between said wall-mounted frame and said hanging frame and a coupling of elastic material on both ends of said elongate body, wherein each coupling is connected to one of, respectively, said wall-mounted frame and said hanging frame, wherein said coupling has a first rigidity in a first substantially horizontal direction parallel to the wall-mounted frame and a second rigidity in a second substantially horizontal direction transverse to said first substantially horizontal direction where the second rigidity is less than the first rigidity.

2. Device as claimed in claim 1, characterized in that said coupling is an integrally formed element.

3. Device as claimed in claim 1, characterized in that said coupling is manufactured from resilient material.

4. Device as claimed in claim 2, characterized in that Polyoxymethylene is used as the resilient material.

5. Device as claimed in claim 1, characterized in that said coupling comprises a releasable engaging member for placing in a co-acting situation with said elongate body.

6. Device as claimed in claim 5, characterized in that said elongate body is hollow at least on the outer ends thereof, wherein a portion of said coupling can be placed in one of the hollow ends of said elongate body.

7. Device as claimed in claim 6, characterized in that said elongate body is provided in at least an internal wall thereof with a recess and said coupling, close to the outer end in the direction of said elongate body, has a protrusion co-acting with the recess in the assembled situation.

8. Device as claimed in claim 7, characterized in that said recess of said elongate body is arranged through the wall of said elongate body wherein said protrusion of said coupling can be pressed out from the outside of said elongate body and co-action between said protrusion and said recess can be discontinued.

9. Device as claimed in claim 1, characterized in that said coupling includes aligning means, wherein in co-action with one of said wall-mounted frame and said hanging frame, said coupling can be aligned relative thereto, and fixing means, wherein after alignment said coupling can be fixed to the respective one of said wall-mounted frame and said hanging frame.

10. Device as claimed in claim 9, characterized in that said wall-mounted frame and said hanging frame each includes a C-shaped profile in which said fixing means engage.

11. Device as claimed in claim 10, characterized in that said fixing means comprises a hammer-head bolt, wherein said coupling includes a passage therefor, and said hammer-head bolt can be arranged in said C-shaped profile.

12. Device as claimed in claim 1, characterized in that said coupling comprises an injection-mouldable sheet profile.

* * * * *